Figure 1:
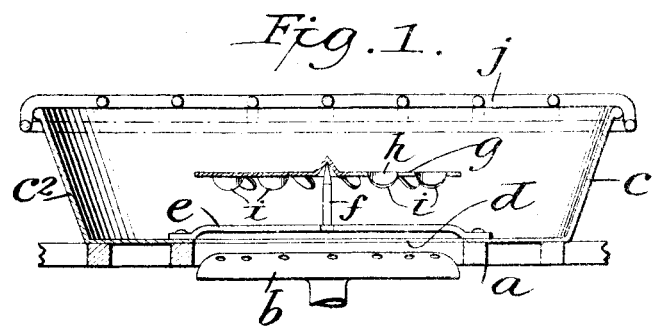

S. REINA.
BROILER ATTACHMENT FOR RANGES AND OTHER HEATERS.
APPLICATION FILED JAN. 12, 1912.

1,036,148.

Patented Aug. 20, 1912.

WITNESSES

INVENTOR
Stephen Reina

UNITED STATES PATENT OFFICE.

STEPHEN REINA, OF NEW YORK, N. Y.

BROILER ATTACHMENT FOR RANGES AND OTHER HEATERS.

1,036,148.

Specification of Letters Patent.

Patented Aug. 20, 1912.

Application filed January 12, 1912. Serial No. 670,893.

*To all whom it may concern:*

Be it known that I, STEPHEN REINA, a subject of the King of Italy, and residing at New York, in the county of New York and State of New York, have invented certain new and useful Improvements in Broiler Attachments for Ranges and other Heaters, of which the following is a specification, such as will enable those skilled in the art to which it appertains to make and use the same.

This invention relates to broiler attachments for ranges, stoves and other heaters and the object thereof is to provide an improved device of this class which may be used in connection with the ordinary range, stove or other heater, and by means of which all kinds of meats, fish, fowl and the like may be quickly, easily and thoroughly broiled, and by means of which bread may be similarly toasted; and with this and other objects in view the invention consists of a device of the class specified, constructed as hereinafter described and claimed.

The invention is fully disclosed in the following specification, of which the accompanying drawing forms a part, in which the separate parts of my improvement are designated by suitable reference characters in each of the views, and in which:—

Figure 2:
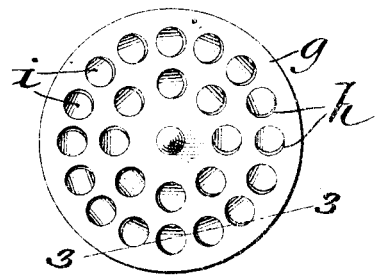
Figure 3:

Figure 1 is a central transverse section of my improved broiler and showing the method of its use. Fig. 2, a plan view of one part of the broiler and Fig. 3, a section on the line 3—3 of Fig. 2.

In the drawing forming part of this specification, I have shown at $a$ the top of a gas range or other heater provided with a burner $b$, and I have also shown at $c$ the preferred form of my improved broiler. The broiler $c$, in the form shown, is made substantially in the shape of a pan or similar article, and comprises a body portion $c^2$, the bottom of which is provided with a large central opening $d$, over which is secured a spider work frame or support $e$ provided centrally with a standard $f$, on which is rotatably mounted a disk or plate $g$, provided with a plurality of apertures $h$, below which are downwardly and laterally directed wings or blades $i$, all of which extend in the same direction, and all of which are, in the form of construction shown, of the same shape as the aperture $h$ and of the same transverse dimensions, said wings or blades being stamped from the metal of the disk or plate $g$ in the operation of forming said apertures. The body $c^2$ of the broiler is also provided with a top or covering $j$ made in the form of a grid and also made detachable, and on which the meat or other material to be broiled or toasted is placed, and on which said meat or other article may be turned in the usual manner in the operation of broiling or toasting the same.

It will be understood that the broiler may be removed from or placed on the heater whenever desired, and when in a position for using, the rotatable disk or plate $g$ is directly over the burner, or in the line of the upwardly moving currents or hot gases produced by the burner or heater, and these upwardly moving currents of hot gases strike the wings or blades $i$ of the disk or plate $g$ and rapidly rotate the same, and the heat or hot gases pass through said disk or plate and around the separate parts of the grid $g$, and over the bottom surface of the meat or other article to be broiled, or bread to be toasted, and this prevents the unequal broiling of the meat, or other article, and the unequal toasting of the bread, the upwardly moving heat products or gas, being thoroughly distributed as will be readily understood.

My invention is not limited to any particular form of the broiler or broiler attachments, the essential feature thereof being the rotatable distributer $g$ placed between the bottom of the broiler and the top thereof.

Having fully described my invention what I claim as new and desire to secure by Letters Patent is:—

A broiler and toaster device comprising a body portion having an open bottom and a grid-formed top, the bottom being provided with a transverse support having a central upright member, and a rotatable heat distributer mounted on said member and provided with openings or apertures, and with propeller plates whereby hot gases passing upwardly through the body portion will pass through and around said heat distributer and rotate the same.

In testimony that I claim the foregoing as my invention I have signed my name in presence of the subscribing witnesses this 11th day of January 1912.

STEPHEN REINA.

Witnesses:
C. E. MULREANY,
A. C. STARCK.